United States Patent
Gunderson et al.

(10) Patent No.: US 10,554,349 B2
(45) Date of Patent: Feb. 4, 2020

(54) APPARATUSES AND METHODS TO CHANGE INFORMATION VALUES

(71) Applicant: Micron Technology, Inc., Boise, ID (US)

(72) Inventors: Marlon Gunderson, Lake Elmo, MN (US); Kurt Ware, Vadnais Heights, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/028,133

(22) Filed: Jul. 5, 2018

(65) Prior Publication Data

US 2018/0316465 A1 Nov. 1, 2018

Related U.S. Application Data

(63) Continuation of application No. 15/012,519, filed on Feb. 1, 2016, now Pat. No. 10,038,523, which is a continuation of application No. 13/529,769, filed on Jun. 21, 2012, now Pat. No. 9,252,996.

(51) Int. Cl.
*H04L 25/02* (2006.01)
*H04L 1/24* (2006.01)
*H04L 25/49* (2006.01)

(52) U.S. Cl.
CPC .............. *H04L 1/24* (2013.01); *H04L 25/028* (2013.01); *H04L 25/0292* (2013.01); *H04L 25/4908* (2013.01)

(58) Field of Classification Search
None
See application file for complete search history.

(56) References Cited

U.S. PATENT DOCUMENTS

| | | | |
|---|---|---|---|
| 5,774,078 A | 6/1998 | Tanaka et al. | |
| 6,557,136 B1* | 4/2003 | Friedmann | G11B 20/10009 714/752 |
| 6,700,903 B1* | 3/2004 | Boyd | H04B 10/272 370/503 |

(Continued)

FOREIGN PATENT DOCUMENTS

JP 2000132919 A 5/2000

OTHER PUBLICATIONS

U.S. Appl. No. 13/529,769, U.S. Pat. No. 9,252,996, filed Jun. 21, 2012, Aparatuses and Methods to Change Information Values.

(Continued)

*Primary Examiner* — Elias Mamo
(74) *Attorney, Agent, or Firm* — Schwegman Lundberg & Woessner, P.A.

(57) ABSTRACT

Some embodiments include apparatuses and methods having a component to change a value of a bit among a number of M bits of information when the M bits have the same value and when M exceeds a selected value. At least one of such embodiments can include a transmitting component to provide the information to a connection. At least one of such embodiments can include a receiving component to receive the information from the connection. In at least one of such embodiments, the selected value can include a maximum number of consecutive bits having the same value that such a receiving component can be configured to receive. Other embodiments including additional apparatuses and methods are described.

18 Claims, 15 Drawing Sheets

(56) References Cited

U.S. PATENT DOCUMENTS

| | | |
|---|---|---|
| 7,058,850 B2 | 6/2006 | Cochran |
| 7,269,778 B1 * | 9/2007 | Feng ................. H03M 5/145 |
| | | 341/59 |
| 7,697,685 B1 * | 4/2010 | Feng ................. H04N 21/2347 |
| | | 380/200 |
| 7,716,411 B2 | 5/2010 | Panabaker et al. |
| 8,055,947 B2 | 11/2011 | Swoboda |
| 8,090,101 B2 | 1/2012 | Ye et al. |
| 9,252,996 B2 | 2/2016 | Gunderson et al. |
| 2006/0171450 A1 | 8/2006 | Walker |
| 2009/0097588 A1 * | 4/2009 | El-Agha ............... H04J 3/0602 |
| | | 375/295 |
| 2009/0292962 A1 | 11/2009 | Thurston et al. |
| 2011/0085609 A1 | 4/2011 | Kasher |
| 2011/0161748 A1 * | 6/2011 | Casper ................. G11C 5/02 |
| | | 714/708 |
| 2013/0343438 A1 | 12/2013 | Gunderson et al. |
| 2014/0115409 A1 | 4/2014 | Miller |
| 2016/0149674 A1 | 5/2016 | Gunderson et al. |

OTHER PUBLICATIONS

U.S. Appl. No. 15/012,519, filed Feb. 1, 2016, Apparatuses and Methods to change Information Values.

* cited by examiner

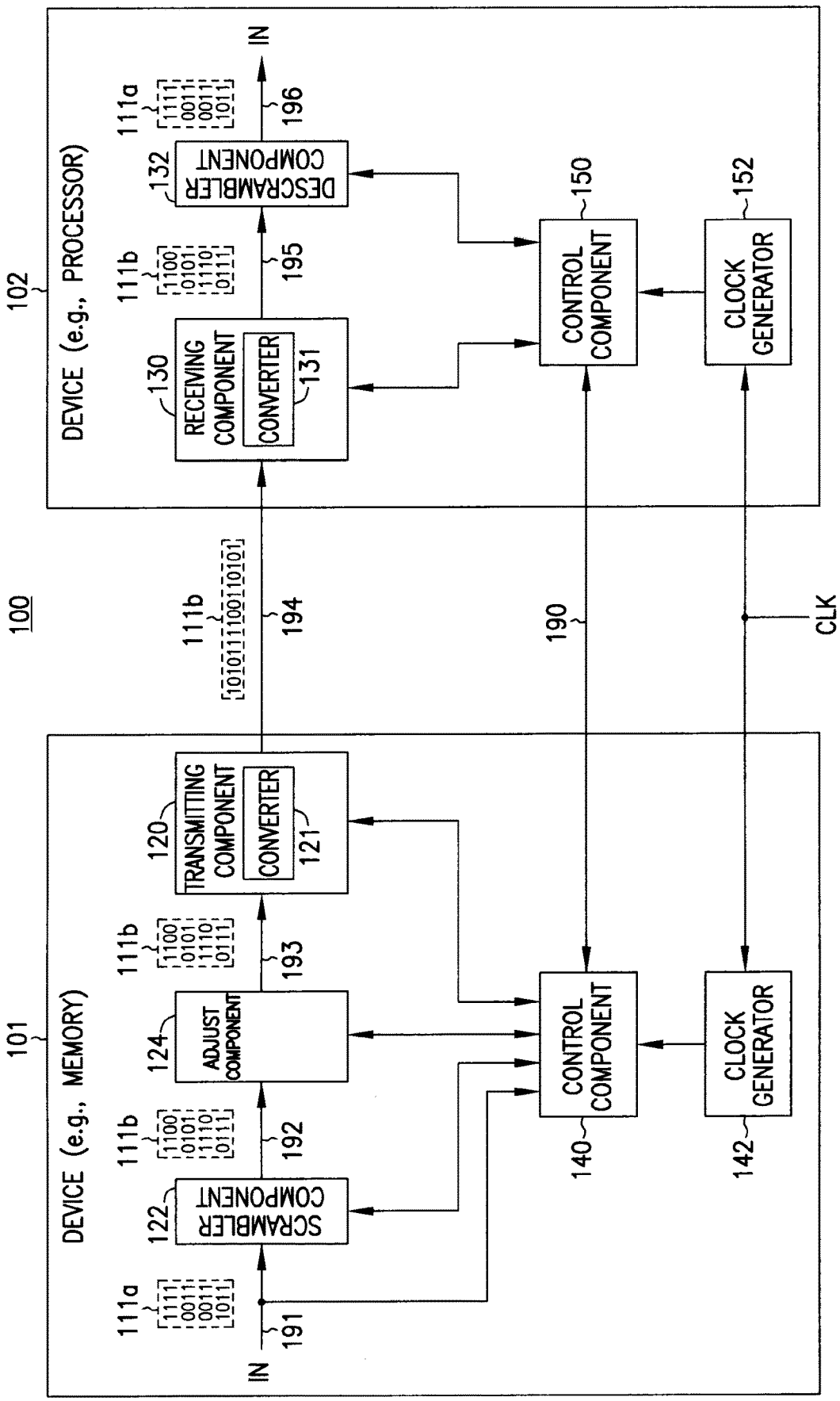

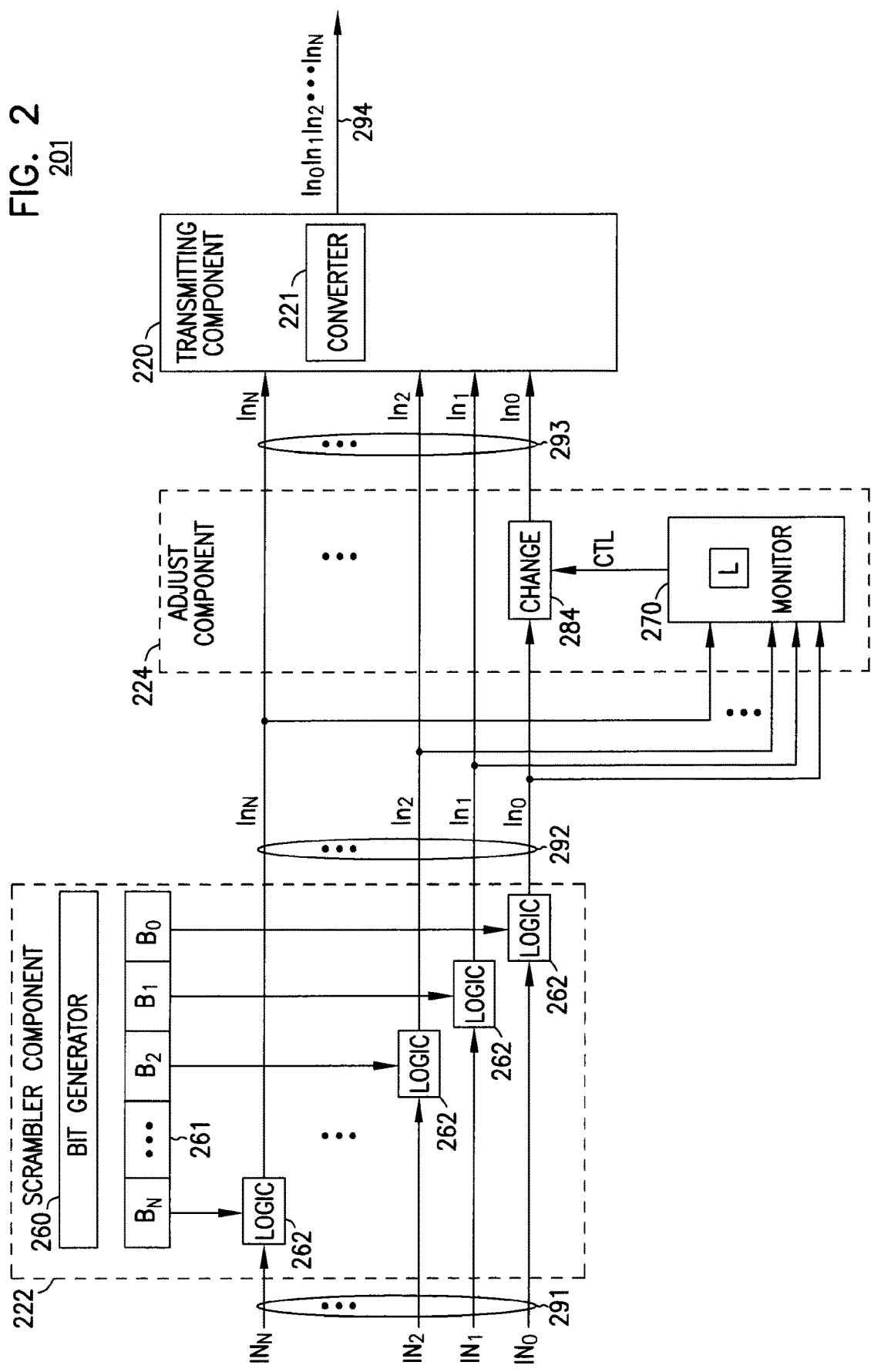

301

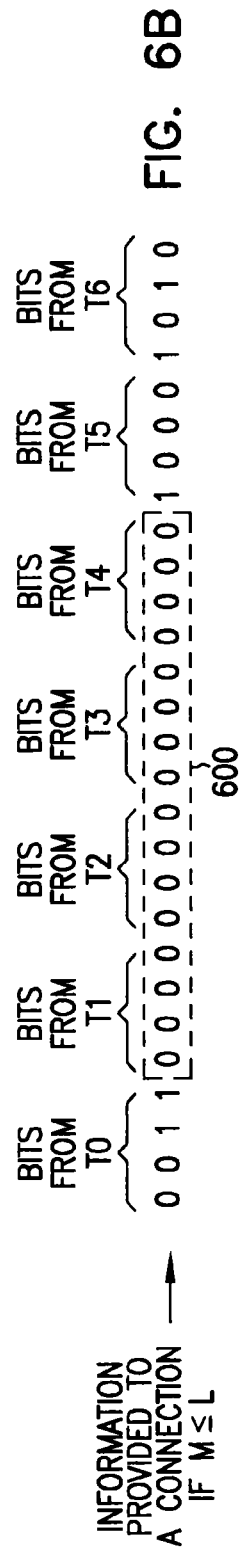

|    | T0 | T1 | T2 | T3 | T4 | T5 | T6 |
|----|----|----|----|----|----|----|----|
| IN₃ | 0 | 0 | 0 | 0 | 0 | 0 | 0 |
| IN₂ | 0 | 0 | 0 | 0 | 0 | 0 | 1 |
| IN₁ | 1 | 1 | 0 | 0 | 0 | 1 | 0 |
| IN₀ | 1 | 1 | 0 | 0 | 0 | 1 | 1 |

INFORMATION TO BE MONITORED } 602

FIG. 6D

BITS FROM T0 { 1 1 0 0 } BITS FROM T1 { 0 0 0 0 } BITS FROM T2 { 0 0 0 0 } BITS FROM T3 { 0 0 0 0 } BITS FROM T4 { 0 0 0 0 } BITS FROM T5 { 1 0 0 0 1 } BITS FROM T6 { 1 0 1 0 } 602

INFORMATION PROVIDED TO A CONNECTION IF M ≤ L

FIG. 6E

BITS FROM T0 { 1 1 0 0 0 0 0 0 0 0 0 0 0 0 0 0 0 0 0 0 0 0 0 0 0 1 0 0 } 1 0 0 0 1 0 1 0 602

INFORMATION PROVIDED TO A CONNECTION IF M > L

FIG. 6F

FIG. 6G $$\begin{array}{c} \text{INFORMATION} \\ \text{TO BE} \\ \text{MONITORED} \end{array} \left\{ \begin{array}{c} \\ IN_3 \\ IN_2 \\ IN_1 \\ IN_0 \end{array} \begin{array}{cccccccc} T0 & T1 & T2 & T3 & T4 & T5 & T6 \\ 0 & 0 & 0 & 0 & 0 & 0 & 1 \\ 0 & 0 & 0 & 0 & 0 & 0 & 1 \\ 1 & 0 & 0 & 0 & 0 & 0 & 1 \\ 1 & 0 & 1 & 0 & 0 & 0 & 0 \end{array} \right\} 604$$

FIG. 6H

INFORMATION PROVIDED TO A CONNECTION IF M ≤ L →

BITS FROM T0 { 1 1 0 0 0 0 0 0 } BITS FROM T1 { 0 0 0 0 0 0 1 } BITS FROM T2 { 0 0 0 0 0 0 0 } BITS FROM T3 { 0 0 0 0 0 0 0 } BITS FROM T4 { 0 0 0 0 0 0 0 } BITS FROM T5 { 0 0 0 0 0 0 0 } BITS FROM T6 { 1 1 1 } 604

FIG. 6I

INFORMATION PROVIDED TO A CONNECTION IF M > L →

INFORMATION TO BE MONITORED:

|     | T0 | T1 | T2 | T3 | T4 | T5 | T6 |
|-----|----|----|----|----|----|----|----|
| IN₃ | 0  | 1  | 1  | 1  | 1  | 0  | 1  |
| IN₂ | 0  | 1  | 1  | 1  | 1  | 1  | 1  |
| IN₁ | 0  | 1  | 1  | 1  | 1  | 1  | 0  |
| IN₀ | 1  | 1  | 1  | 1  | 1  | 0  | 1  |

INFORMATION PROVIDED TO A CONNECTION IF $M \leq L$:

BITS FROM T0: 1 0 0 0 | BITS FROM T1: 1 1 1 1 | BITS FROM T2: 1 1 1 1 | BITS FROM T3: 1 1 1 1 | BITS FROM T4: 1 1 1 1 | BITS FROM T5: 0 1 1 1 1 0 | BITS FROM T6: 1 1 0 1 0

INFORMATION PROVIDED TO A CONNECTION IF $M > L$:

INFORMATION TO BE MONITORED

BITS FROM T0: 0 0
BITS FROM T1: 1 1 1 1
BITS FROM T2: 1 1 1 1
BITS FROM T3: 1 1 1 1
BITS FROM T4: 1 1 1 1
BITS FROM T5: 0 1 1 1
BITS FROM T6: 0 1 0

INFORMATION PROVIDED TO A CONNECTION IF M ≤ L

INFORMATION PROVIDED TO A CONNECTION IF M > L

702

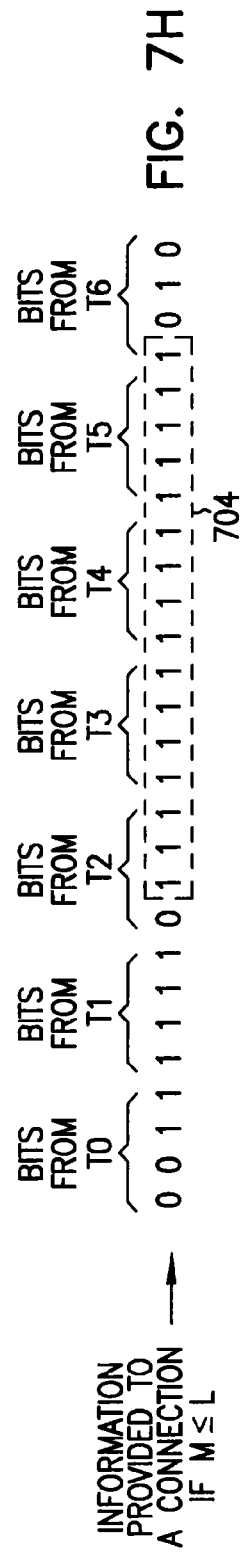
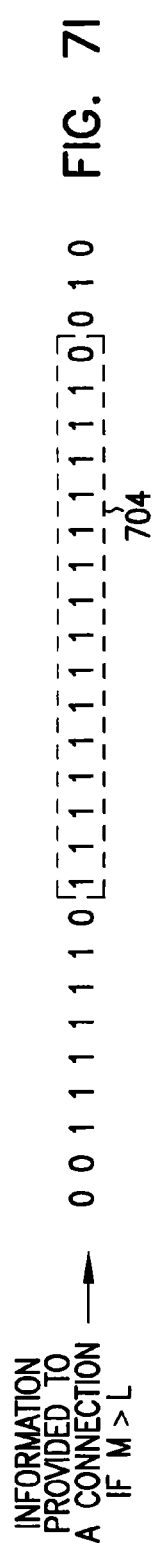

800

APPARATUSES AND METHODS TO CHANGE INFORMATION VALUES

PRIORITY APPLICATION

This application is a continuation of U.S. application Ser. No. 15/012,519, filed Feb. 1, 2016, which is a continuation of U.S. application Ser. No. 13/529,769, filed Jun. 21, 2012, now issued as U.S. Pat. No. 9,252,996, all of which are incorporated herein by reference in their entireties.

BACKGROUND

Many items such as computers, digital televisions, digital cameras, cellular phones, and other electronic products, often have internal devices and associated connections to allow the exchange of information among such devices. The information can be in the form of signals representing bits of the information. Some devices may be designed to require signal transitions within a certain time limit. Thus, in these devices, operational failure may occur when the time limit is violated.

BRIEF DESCRIPTION OF THE DRAWINGS

FIG. 1A is a block diagram of an apparatus in the form of a system including devices and a connection between the devices, according to an embodiment of the invention.

FIG. 2 is a block diagram of a device having a scrambler component and an adjust component, according to an embodiment of the invention.

FIG. 6A through FIG. 6I show example values of bits of information including consecutive bits having the same binary zero value, according to an embodiment of the invention.

FIG. 7A through FIG. 7I show example values of bits of information including consecutive bits having the same binary one value, according to an embodiment of the invention.

DETAILED DESCRIPTION

Figure 1B:
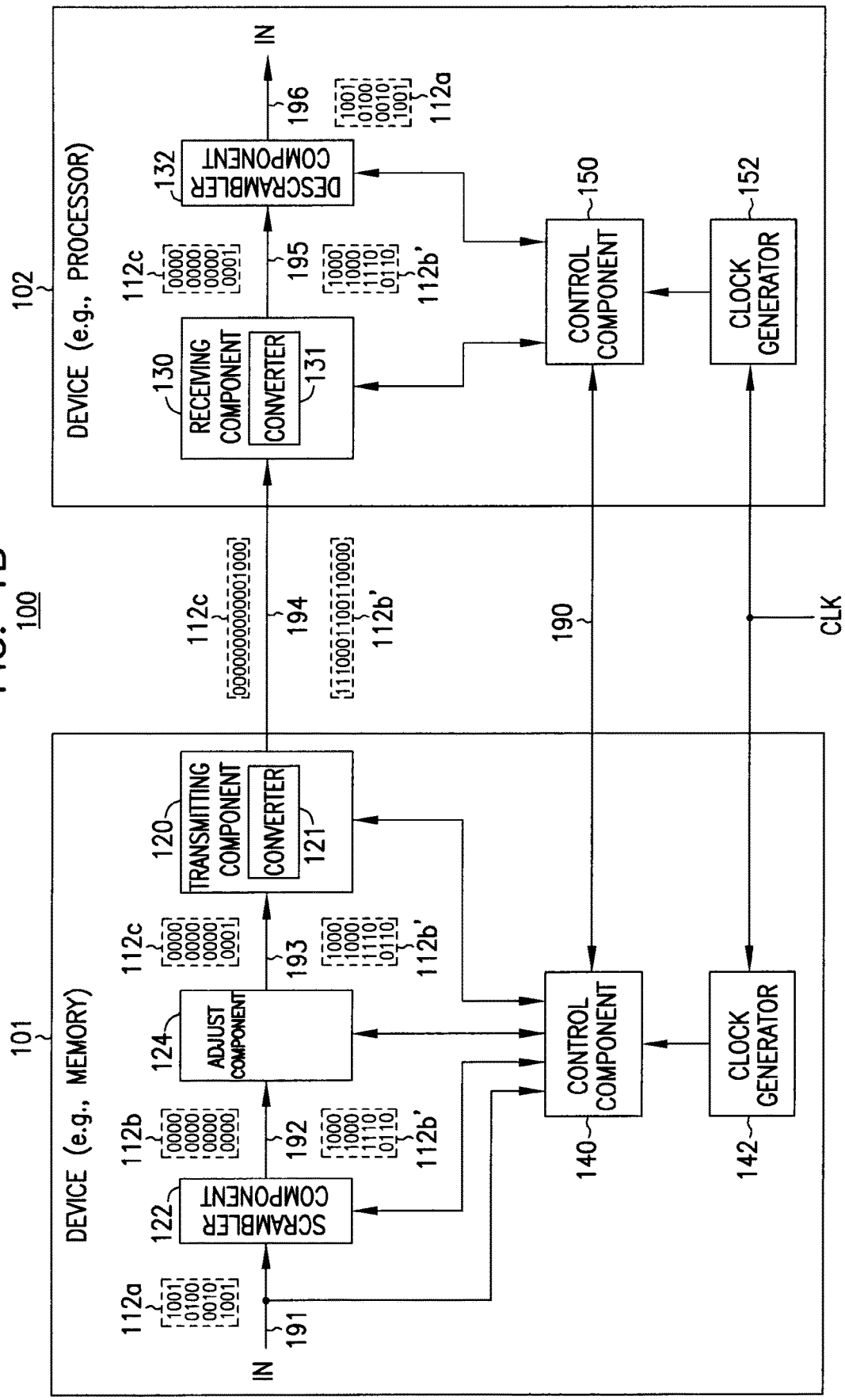
FIG. 1B shows an example of one device according to the system of FIG. 1A operating to prevent M consecutive bits having the same binary zero value from being provided to another device when M exceeds a selected value associated with a receiving component of the other device, according to an embodiment of the invention.

FIG. 1A is a block diagram of an apparatus in the form of a system 100 including devices 101 and 102, and a connection 194 between the devices 101, 102, according to an embodiment of the invention. System 100 may comprise an electronic system such as a computer (e.g., a laptop, a tablet, or other types of computer), a mobile phone (e.g., a smart phone), a digital camera, and other electronic systems.

Device 101 can include a memory device (e.g., a dynamic random access memory device (DRAM)). Device 102 can include a processor (e.g., a general purpose processor), an application specific integrated circuit (ASIC), or other types of processor. Connection 194 can include a communication link (e.g., a bus having conductive lines, or a fiber optic link) to provide (e.g., transfer) information IN from device 101 to device 102. A connection described herein, such as connection 194, can be either a direct/physical (e.g., wired) connection or an indirect/virtual (e.g., wireless) connection. The connections may not need to be electrical connections (e.g., it can be optical connections).

For the purposes of this document, information (e.g., information IN) can include data, codes (e.g., error correction codes), commands, any combination of data, codes, and commands, or other types of information. System 100 can be configured to execute an operation (e.g., a read operation) in which device 101 can provide information IN (e.g., data stored in device 101) to device 102 through connection 194.

Devices 101 and 102 can include control components 140 and 150, respectively. System 100 can include a connection 190 to allow control components 140 and 150 to communicate (e.g., exchange commands) with each other. Devices 101 and 102 can communicate with each other based on communication protocol recognized by devices 101 and 102.

Devices 101 and 102 can include clock generators 142 and 152, respectively, to receive a clock signal CLK (e.g., a reference clock signal). Each of clock generators 142 and 152 can include a phase-locked loop to generate clock signals based on clock signal CLK. Information exchanged between devices 101 and 102 can be based on timing of the clock signal CLK or timing of clock signals generated based on clock signal CLK.

Device 101 and 102 can exchange information with each other using a packet-based protocol. For example, device 101 can provide information to device 102 in packets (e.g., streams of bits of information) through connection 194.

Device 101 can include a transmitting component 120 to provide information to device 101 through connection 194. Transmitting component 120 can include at least one transmitter circuit. The information provided by transmitting component 120 to connection 194 can be based on information IN on line 191. Information IN can include information stored in memory cells of at least one memory array (not shown in FIG. 1A) of device 101. Information IN can include a number of bits, such as bits 111$a$, having binary zero and one values. FIG. 1A shows information IN having 16 bits 111$a$ as an example; the number of bits of information IN can vary.

Device 101 can include a scrambler component 122 to change information IN on line 191 and provide information having bits 111$b$ on line 192. Thus, information IN on line 191 can be referred to as original version of the information and the information on line 192 can be changed information (e.g., changed version) based on information on line 191. Scrambler component 122 can be configured to change information IN (e.g., perform logic operations on bits of information IN) to improve signal transitions that represent values (binary zero and one) of the information to be provided to connection 194. For example, as shown in FIG. 1A, the values of bits 111b on line 192 can include changed values (e.g., scrambled values) of the values (e.g., original values) of bits 111a, such that bits 111a and bits 111b can have combinations of binary zero and one values that differ from each other.

Device 101 can include an adjust component 124 to conditionally change the value of at least one bit among bits 111b of the information (e.g., changed information) on line 192. The condition can be based on the values of bits 111b on line 192. FIG. 1A shows an example where adjust component 124 can keep the values of bits 111b unchanged when bits 111b are provided (e.g., transferred) from line 192 to line 193. However, depending on the values of bits 111b on lines 192 (as described below with reference to FIG. 1B and FIG. 1C) adjust component 124 can sometimes change the value of a selected bit (or multiple selected bits) among bits 111b before adjust component 124 provides that selected bit (or multiple selected bits) to transmitting component 120.

In FIG. 1A, each of lines 191, 192, and 193 is shown as a single line for simplicity. Each of these lines, however, can include a set of multiple lines (e.g., multiple conductive lines). For example, line 191 can include a set of multiple lines (e.g., a bus), such that scrambler component 122 can concurrently receive multiple bits among bits 111a (e.g., receive multiple bits at a time, such as receiving multiple bits in parallel). Line 192 can include a set of multiple lines, such that adjust component 124 can concurrently receive multiple bits among bits 111b from scrambler component 122. Line 193 can include a set of multiple lines, such that transmitting component 120 can concurrently receive multiple bits among bits 111b from adjust component 124.

Transmitting component 120 can include a converter 121 (e.g., a parallel to serial converter, such as a serializer) to concurrently receive multiple bits among bits 111b from adjust component 124. Converter 121 can operate to arrange bits 111b on line 193 into serial bits (e.g., a serial stream of bits). Then, transmitting component 120 can serially provide (e.g., provide one bit at a time) bits 111b to connection 194. Bits 111b on connection 194 can represent a packet of information provided from device 101 to device 102.

Device 102 can include receiving component 130 to receive bits (e.g., bits 111b) of information provided on connection 194 by device 101. Receiving component 130 can include at least one receiver circuit. Receiving component 130 can include an analog receiver component to receive the bits of information from connection 194 in the form of a signal on connection 194. The signal on connection 194 can be provided with different voltage levels to represent different values (e.g., binary zero and one) of the bits of information on connection 194.

Receiving component 130 can include a converter 131 (e.g., a serial to parallel converter, such as a deserializer) to serially receive (e.g., receive one bit at a time) bits 111b from connection 194. Converter 131 can operate to arrange bits 111b, which are serially received from connection 194, into a parallel arrangement of the bits, and provide the parallel bits to a descrambler component 132 of device 102.

In FIG. 1A, each of lines 195 and 196 is shown as a single line for simplicity. Each of these lines can include a set of multiple lines. For example, each of lines 195 and 196 can include a set of multiple lines, such that descrambler component 132 can concurrently receive multiple bits among bits 111b from receiving component 130 and concurrently provide multiple bits among bits 111a to the set of multiple lines.

The values of bits 111b received at receiving component 130 can include changed values (e.g., scrambled values) of the values of bits 111a of information IN on line 191 (e.g., bits of the original version of the information, such as information IN) of device 101. Device 101 and 102 can communicate with each other such that descrambler component 132 of device 102 can correctly provide (e.g., regenerate) bits having the same values as those of bits 111a on lines 191 of device 101 based on the received bits 111b. As shown in FIG. 1A, descrambler component 132 can descramble bits 111b on line 195 to provide (e.g., regenerate) bits 111a on line 196 (which have the same values as those of bits 111a on line 191). Descrambler component 132 can provide bits 111a from line 196 to other components in device 102 or in system 100 for further processing. Scrambling and descrambling of bits of information performed in devices 101 and 102 can be implemented using conventional techniques (e.g., using additive scramblers and descramblers).

One of ordinary skill in the art may realize that device 101 (e.g., a memory device) and device 102 (e.g., a processor) may include other elements, several of which are not shown in FIG. 1A, so as not to obscure the example embodiments described herein.

In FIG. 1A, information on connection 194 can include a number of consecutive bits M (an integer) of information having the same value (e.g., either the same binary zero or the same binary one). Receiving component 130 can be configured to receive these M consecutive bits having the same value if M does not exceed (is not greater than) a selected value L. The selected value L can include a maximum number (e.g., a run length limit) of consecutive bits having the same value that receiving component 130 can correctly receive from connection 194. Receiving component 130 may fail to receive M consecutive bits having the same value from connection 194 if M is greater than the selected value L. Fail to receive M consecutive bits having the same value means that either receive component 130 is unable to receive all of the M bits (e.g., receive fewer than M bits) or receive component 130 may still receive all of the M bits but the values of the M bits may become unreliable (e.g., the value of at least one bit may be corrupted).

The selected value L associated with receiving component 130 can be determined by observing the operation (e.g., during a test) of receiving component 130. For example, different numbers of M consecutive bits having the same value can be provided to receiving component 130. Then, the selected value L can be deemed to be equal to the number of M−1 consecutive bits having the same value that cause the receiving component 130 to fail to receive those M consecutive bits. For example, if it is observed that 85 consecutive bits having the same value (either binary zero or binary one) could cause receiving component 130 to fail to receive such 85 consecutive bits, then the selected value L can be deemed to be equal to 84.

Device 101 or 102 or both can include a mechanism (e.g., a cyclic redundancy check) to detect whether errors have occurred in information exchanged between devices 101 and 102. Control components 140 and 150 can communicate with each other to correct such errors. For example, if an error has occurred such that a value of one bit (or multiple bits) of particular information (e.g., a particular packet) provided from device 101 to device 102 does not match its intended value (e.g., changed from binary zero to binary one or vice versa), device 102 can correct the error bit (or bits) using conventional error correction detection techniques. Alternatively, if such an error has occurred, devices 101 and 102 can communicate with each other such that device 101 can again provide such particular information to device 102 in another transmission (e.g., a retransmission), as described in more detail below.

A communication regarding a retransmission of information can include a notification (e.g., a retransmission notification), a request (e.g., retransmission request), or both. The notification can be provided from device 101 to device 102 to inform device 102 of a retransmission of the information. The request can be provided from device 102 to device 101 to request a retransmission of information.

In some situations, as described below with reference to FIG. 1B and FIG. 1C, device 101 can intentionally force an error in information before it provides such information to device 102. For example, in a transmission to provide information to device 102, device 101 can operate to intentionally cause a bit (or multiple bits) of the information to have a value different from the true value (e.g., intended value) of that bit before device 101 provides the information (which has a forced error bit) to device 102 through connection 194.

In this example, since the information having the error is known by device 101 before the information is provided to connection 194, device 101 can perform a retransmission operation to provide information (with the intended value) to device 102 in one or more additional attempts. The example described here may occur in system 100 when information intended to be provided from device 101 to device 102 includes a number of M consecutive bits having the same value (e.g., either the same binary zero or the same binary one) in which M exceeds the selected value L associated with receiving component 130 of device 102.

FIG. 1B shows an example where device 101 can prevent M consecutive bits having the same binary zero value from being provided to connection 194 when M exceeds the selected value L associated with receiving component 130 of device 102. The example associated with FIG. 1B assumes that the selected value L associated with receiving component 130 of device 102 is 15 (e.g., L=15). The selected value L=15 is only an example. The selected value L can be any value greater than two. In this example, since the selected value L=15, receiving component 130 may fail to receive 16 (M=16) consecutive bits having the same value (e.g., binary zero value in this example) from connection 194 because the number (M=16) of consecutive bits having the same value on connection 194 exceeds the selected value (L=15) associated with receiving component 130.

As shown in FIG. 1B, scrambler component 122 can receive information including bits 112*a* from line 191 and provide information (e.g., changed information) including bits 112*b* on line 192. FIG. 1B shows the information on lines 191 and 192 having 16 bits as an example; the number of bits can vary. In FIG. 1B, bits 112*b* on line 192 are the bits to be serially provided to connection 194 as consecutive bits. However, bits 112*b* include M=16 consecutive bits having the same binary zero value. Thus, receiving component 130 of device 102 may fail to receive bits 112*b* if these bits are consecutively provided to connection 194. To prevent such a situation from happening, adjust component 124 can operate to change the values of bits 112*b* so that the number of consecutive bits having the same binary zero value does not exceed the selected value L associated with receiving component 130. For example, as shown on line 193 in FIG. 1B, adjust component 124 can change the value of one of bits 112*b* from binary zero to binary one. Changing the value of one of bits 112*b* from binary zero to binary one reduces the number of consecutive bits having the same binary zero value from 16 to 15. Thus, as shown in FIG. 1B, receiving component 130 can receive bits 112*c* because bits 112*c* have only M=15 consecutive bits of binary zero value, such that M does not exceed the selected value L.

FIG. 1B shows adjust component 124 changing the value of only one bit among bits 122*b* from binary zero to binary one as an example. Adjust component 124, however, can change the value of multiple bits among bits 122*b*. FIG. 1B also shows the value of a bit at a certain bit position being changed. However, the value of a bit at any bit position can be changed as long as the number of M consecutive bits having the same binary zero can be reduced so that M does not exceed the selected value L.

FIG. 1B also shows an example of a retransmission operation. Since the value of bits 112*c* include a bit with a value (binary one) different from its intended value (e.g., binary zero) as a result of the change (e.g., a forced error bit described above), devices 101 and 102 can communicate with each other, such that device 101 can perform a retransmission operation to provide information with intended values (e.g., values based on bits 112*a*) to device 102. For example, in FIG. 1B, device 102 can send a retransmission request to device 101 after device 102 receives bits 112*c* (e.g., bits with a forced error bit of binary one value). Device 101 can perform a retransmission operation in response to the retransmission request.

In the retransmission operation, scrambler component 122 can provide (e.g., generate) bits 112*b*' based on the same bits 112*a* on line 191 that were used to provide bits 112*b* (e.g., provided in the previous transmission). Device 101 can include a memory (e.g., a buffer, not shown) to store bits 112*a* after they are received on line 191. Bits 112*a* can be temporarily stored in the memory until device 101 can confirm that bits 112*a* have been received by device 102 without errors. If an error (e.g., a forced error bit) has occurred, scrambler component 122 can use the same bits 112*a* (stored in the memory) to provide bits 112*b*' for the retransmission operation.

Scrambler component 122 can generate a number of sequences of bits having different sequence values. For example, scrambler component 122 can generate sequences of bits having different pseudo random values. Scrambler component 122 can use a sequence of bits (e.g., a sequence of bits having pseudo random values) and bits 112*a* to provide bits 112*b* for a transmission and use another sequence of bits (e.g., another sequence of bits having pseudo random values) and bits 112*a* to provide bits 112*b*' for the retransmission operation. Since the sequences of bits have different sequence values, bits 112*b* and bits 112*b*' can have different values.

As shown in FIG. 1B, scrambler component 122 can provide bits 112*b*' where the number of consecutive bits having the same value (either the same binary zero or the same binary one) does not exceed limit value L associated with receiving component 130 of device 102. Thus, adjust component 124 can keep the values of bits 112*b*' unchanged and provide them to transmitting component 120, which provides bits 112*b*' to connection 194. After bits 112*b*' are received by receiving component 130, descrambler component 132 can descramble bits 112*b*' to provide (e.g., regenerate) bits 112*a*, which have the same values as that of bits 112*a* of information IN on line 191.

Thus, as described above with reference to FIG. 1B, adjust component 124 of device 101 can change the value of at least one bit among M consecutive bits having the same binary zero value when M exceeds limit value L associated with receiving component 130 of device 102. Then, device 101 can perform a retransmission operation to resend the information with intended values to device 102.

Providing information from device 101 to device 102 using techniques described herein (e.g., providing information (e.g., bits 112*c*) with a forced (e.g., known) error bit and then performing a retransmission operation) may allow more reliability in maintaining the flow of information between devices 101 and 102. Further, some conventional systems may require re-initialization to avoid information received at receiving components in the system from becoming unreliable (e.g., due to factors such a run length limit of the receiving components being violated). Using techniques described herein (e.g., force an error and then perform a retransmission operation) may incur smaller penalty than using a re-initialization technique of some conventional systems.

Figure 1C:
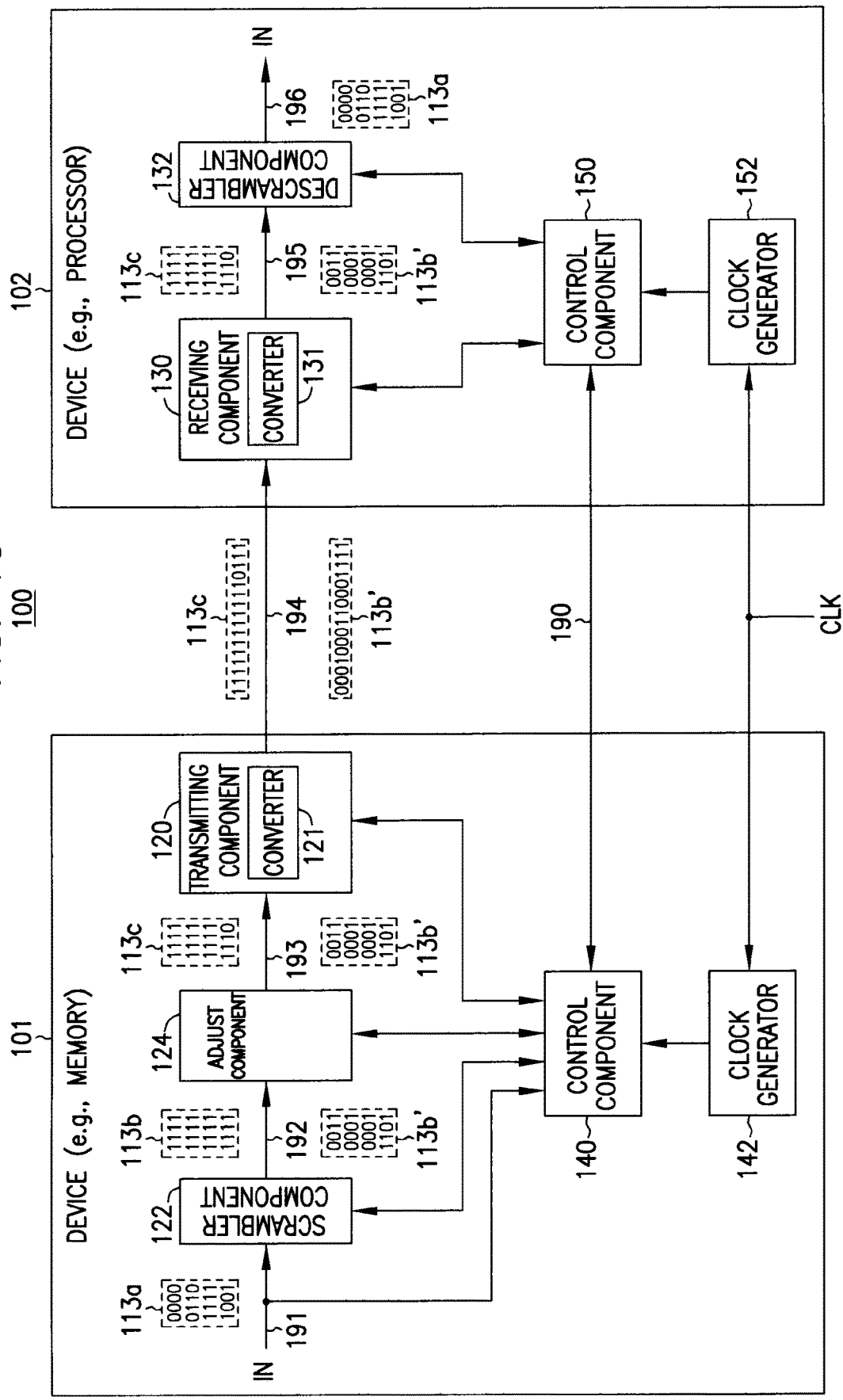
FIG. 1C shows an example of one device according to the system of FIG. 1A operating to prevent M consecutive bits having the same binary one value from being provided to another device when M exceeds a selected value associated with a receiving component of the other device, according to an embodiment of the invention.

FIG. 1C shows an example where device 101 can prevent M consecutive bits having the same binary one from being provided to connection 194 when M exceeds the selected value L associated with receiving component 130 of device 102. The operations of system 100 in the example associated with FIG. 1C is similar to those in the example associated with FIG. 1B. However, the example associated with FIG. 1C shows M consecutive bits having the same binary one value, where M exceeds the selected value L (which is 15 in this example).

As shown in FIG. 1C, information IN on line 191 can include bits 113*a*. Scrambler component 122 can provide information on line 192 including bits 113*b*, which are to be provided to connection 194 as consecutive bits. However, bits 113*b* include M=16 consecutive bits having the same binary one value. Thus, receiving component 130 of device 102 may fail to receive bits 113*b* if these bits are consecutively provided to connection 194. To prevent a such a situation from happening, adjust component 124 can operate to change the value of one of bits 113*b* from binary one to binary zero, as shown in bits 113*c* on lines 193. This reduces the number of consecutive bits having the same binary one from 16 to 15. Thus, as shown in FIG. 1C, receiving component 130 can receive bits 13*c* because bits 113*c* have M=15 consecutive bits of binary one value where M does not exceed the selected value L.

FIG. 1C also shows an example of a retransmission operation. Since the value of bits 113*c* include a bit with a value (binary zero) different from its intended value (e.g., binary one) as a result of change (described above), devices 101 and 102 can communicate with each other, such that device 101 can perform a retransmission operation to provide information with intended values (e.g., values based on bits 113*a*) to device 102. For example, similar to the example associated with FIG. 1B, device 102 in FIG. 1C can send a retransmission request to device 101 after device 102 receives bits 113*c* (e.g., bits with a forced error bit of binary zero value). Device 101 can perform a retransmission operation in response to the retransmission request.

In the retransmission operation, scrambler component 122 can provide bits 113*b*' based on the same bits 113*a* on line 191 that were used to provide bits 113*b* (e.g., provided in the previous transmission). For example, as described above with reference to FIG. 1B, device 101 can include a memory (e.g., a buffer) to temporary store bits after they are received on line 193. In FIG. 1C, device 101 can temporary store bits 113*a* in the memory after they are received on line 191. In the retransmission operation, scrambler component 122 can use the same bits 113*a* (stored in the memory) to provide bits 113*b*' for the retransmission operation. Scrambler component 122 can use a sequence of bits (e.g., a sequence of bits having pseudo random values) and bits 113*a* to provide bits 113*b* for a transmission and use another sequence of bits (e.g., another sequence of bits having pseudo random values) and bits 113*a* to provide bits 113*b*' for the retransmission operation.

As shown in FIG. 1C, scrambler component 122 can provide bits 113*b*' where the number of consecutive bits having the same value (either the same binary zero or the same binary one) does not exceed limit value L associated with receiving component 130 of device 102. Thus, adjust component 124 can keep the values of bits 113*b*' unchanged and provide them to transmitting component 120, which provides bits 113*b*' to connection 194. After bits 113*b*' are received by receiving component 130, descrambler component 132 can descramble bits 113*b*' to provide (e.g., regenerate) bit 113*a*, which have the same values as that of bits 113*a* of information IN on line 191.

Thus, as described above with reference to FIG. 1C, adjust component 124 of device 101 can change the value of at least one bit among M consecutive bits having the same binary one value when M exceeds limit value L associated with receiving component 130 of device 102. Then, device 101 can perform a retransmission operation to resend the information with intended values to device 102.

System 100 and devices 101 and 102 described above with reference to FIG. 1A, FIG. 1B, and FIG. 1C can include systems and devices described below with reference to FIG. 2 through FIG. 9.

FIG. 2 is a block diagram of a device 201 having a scrambler component 222 and an adjust component 224, according to an embodiment of the invention. Device 201 can include a transmitting component 220, a scrambler component 222, and an adjust component 224 that can correspond to transmitting component 120, scrambler component 122, and adjust component 124, respectively, of FIG. 1A, FIG. 1B, and FIG. 1C. Lines 291, 292, and 293, and connection 294, can correspond to lines 191, 192, and 193, and connection 194, respectively, of FIG. 1A, FIG. 1B, and FIG. 1C.

In FIG. 2, scrambler component 222 can receive information having bits $IN_0$, $IN_1$, and $IN_2$ through $IN_N$ (which can include an original version of information) on lines 291 and provide changed information having corresponding bits $In_0$, $In_1$, and $In_2$ through $In_N$ on lines 292. Scrambler component 222 can include a bit generator 260 to generate a number of sequences of bits. Each of the sequences of bits can include bits 261 having bits $B_0$, $B_1$, and $B_2$ through $B_N$. Bit generator 260 can include a pseudo random bit generator to generate sequences of bits having different pseudo random values. For example, bit generator 260 can include a linear feedback shift register to generate a large number (e.g., $2^{15}-1$) of sequences of bits having different values (e.g., different pseudo-random values). Thus, the values of bits $B_0$ through $B_N$ of one sequence of bits can be different from values of bits $B_0$ through $B_N$ of another sequence of bits.

Scrambler component 222 can include logic components 262. Logic components 262 can operate to perform logic operations to change (e.g., scramble) the values of bits $IN_0$ through $IN_N$ on lines 291 based on the values of bits $B_0$ through $B_N$. Bits $In_0$ through $In_N$ on lines 292 can correspond to changed values (e.g., scrambled values) of the original values of bits $IN_0$ through $IN_N$ on lines 291. Each of bits $In_0$ through $In_N$ on lines 292 can be a result of a logic operation (e.g., an exclusive OR (EXOR) operation performed on corresponding bits at the same bit position among bits $IN_0$ through $IN_N$ and bits $B_0$ through $B_N$. For example, bit $In_0$ can be a result of a logic operation performed on bits $IN_0$ and $B_0$. In another example, bit $In_N$ can be a result of a logic operation performed on bits $IN_N$ and $B_N$.

Generator 260 can be configured such that the values of the sequences of bits $B_0$ through $B_N$ can reduce the chance of bits $In_0$ through $In_N$ on lines 292 (after the logic operations) from having M bits with the same value to be consecutively provided to connection 294 where M exceeds a selected value L associated with a receiving component coupled to line 294. In some rare cases, however, a situation may occur where M bits on lines 292 to be consecutively provided to connection 294 can have the same value and M exceeds a selected value L. If such a situation occurs, adjust component 224 can change the values of the bits on lines 292 to prevent M bits on lines 292 to be consecutively provided to connection 294 where M exceeds a selected value L.

Adjust component 224 can include a monitor 270 to monitor the values (e.g., binary zero and one) of the bits on lines 292. Monitor 270 can provide control information CTL having different values, depending on the values of bits $In_0$ through $In_N$ on lines 292. Control information CTL can include digital information. For example, control information CTL can include only a single bit (or alternatively, multiple bits). Monitor 270 can operate to provide control information CTL with one value (e.g., binary one) if a number of M bits on lines 292 to be consecutively provided to connection 294 have the same value, when M exceeds a selected value (e.g., the selected value L described above with reference to FIG. 1B and FIG. 1C). Monitor 270 can operate to provide control information CTL with another value (e.g., binary zero) if a number of M bits on lines 292 to be consecutively provided to connection 294 have the same value, when M does not exceed the selected value. As described above with reference to FIG. 1A, FIG. 1B, and FIG. 1C, the selected value (e.g., the selected value L) can be a maximum number of M consecutive bits having the same value that a receiving component (e.g., receiving component 130 of FIG. 1A) coupled to connection 294 can receive.

Adjust component 224 can include a change component 284, that can be located on a path between one of lines 292 and one of lines 293. Based on the value of control information CTL, change component 284 can conditionally change a value of a bit (e.g., bit $In_0$) among a number of M bits on lines 292 to be consecutively provided to connection 294. For example, change component 284 can change a value of bit $In_0$ among a number of M bits on lines 292 if control information CTL has one value (e.g., binary one). Thus, after the change, bit $In_0$ on one of lines 293 becomes a changed bit with respect to bit $In_0$ on one of lines 293. Change component 284 can keep the value of a bit $In_0$ unchanged if control information CTL has another value (e.g., binary zero).

Adjust component 224 can keep the values of bits $In_1$ through $In_N$ unchanged. As shown in FIG. 2, lines 293 can form part of some or all of lines 292. For example, lines 293 associated with bits $In_1$, and $In_2$ through $IN_N$ can be exactly the same as those of lines 292. Thus, the values of bits $In_1$ and $In_2$ through $In_N$ can remain unchanged from lines 292 to lines 293. In some embodiments, only some of the lines 293 associated with bits $In_1$, and $In_2$ through $IN_N$ are exactly the same as those of lines 292. Thus, only some of the values of bits $In_1$ and $In_2$ through $In_N$ remain unchanged from lines 292 to lines 293.

Transmitting component 220 can operate to serially provide the bits on lines 293 to connection 294. Transmitting component 220 can include a converter 221 (e.g., a parallel to serial converter) to concurrently receive bits $In_0$ through $In_N$ from lines 293. Converter 221 can operate to arrange bits $In_0$ through $In_N$ from lines 293 into serial bits. Then, transmitting component 220 can serially provide bits $In_0$ through $In_N$ to connection 294.

Among bits $In_0$ through $IN_N$ on lines 291, bit $IN_0$ can be a lower order bit (e.g., the least significant bit (LSB)), and bit $IN_N$ can be a higher order bit (e.g., most signification bit (MSB)). Among bit $In_0$ through $In_N$ on lines 292, bit $In_0$ can be a lower order bit, and bit $In_N$ can be a higher order bit. Alternatively, among bits $IN_0$ through $IN_N$, bit $IN_0$ can be the higher order bit, and bit $IN_N$ can be the lower order bit. Among bits $In_0$ through $In_N$, bit $In_0$ on lines 292 can be the higher order bit, and bit $In_N$ can be the lower order bit.

FIG. 2 shows an example bit order of $In_0$, $In_1$, and $In_2$ through $In_N$ on connection 294 where bit $In_0$ can be provided to connection 294 before the other bits. The bit order can be different from the one shown in FIG. 2, such that bit $In_0$ can be provided to connection 294 after the other bits, for example.

FIG. 2 shows an example where change component 284 can be located on a path (e.g., line) associated with bit $In_0$ to change the value of a bit at a bit position corresponding to bit $In_0$. Change component 284, however, can be located on a different path associated with any of bits $In_1$ through $In_N$ to change the value of a bit at a bit position corresponding to any of bits $In_1$ through $In_N$.

FIG. 2 shows adjust component 224 having only one change component 284 as an example. Adjust component 224, however, can include multiple change components similar to or identical to change component 284. Such multiple change components can be configured to respond to the same control information CTL to conditionally change the values of multiple bits among bits $In_0$ through $In_N$.

Figure 3:
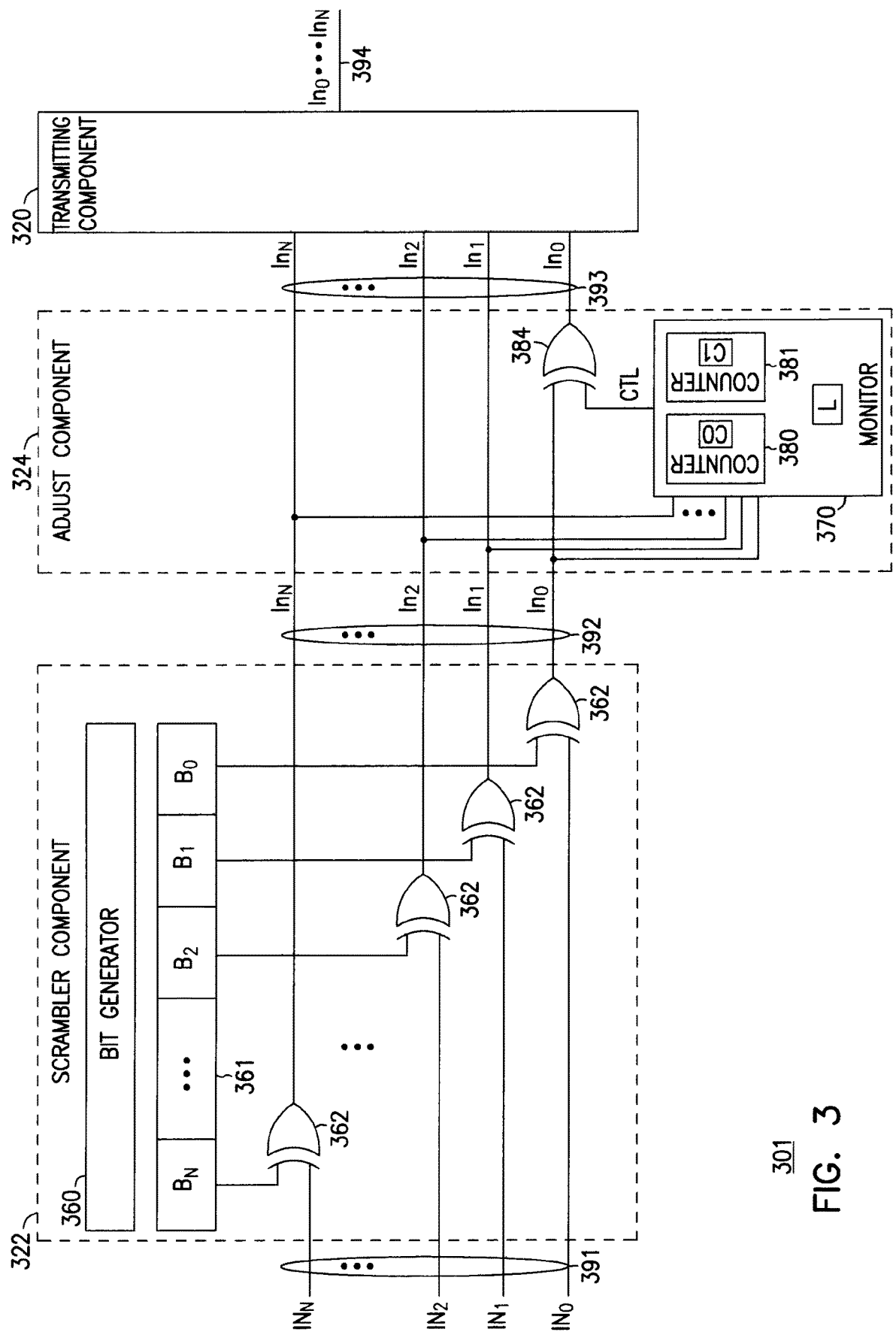
FIG. 3 is a block diagram of a device having a scrambler component and an adjust component including counters, according to an embodiment of the invention.

FIG. 3 shows a block diagram of a device 301 having a scrambler component 322 and an adjust component 324 including counters 380 and 381, according to an embodiment of the invention.

Device 301 can include a transmitting component 320, a scrambler component 322, and an adjust component 324 that can correspond to transmitting component 220, scrambler component 222, and adjust component 224, respectively, of FIG. 2. Transmitting component 320, scrambler component 322, and adjust component 324 of FIG. 3 can also correspond to transmitting component 120, scrambler component 122, and adjust component 124, respectively, of FIG. 1. Lines 391, 392, and 393, and connection 394 of FIG. 3 can correspond to lines 291, 292, and 293, and connection 294, respectively, of FIG. 2, or lines 191, 192, and 193, and connection 194, respectively, of FIG. 1. In FIG. 3, bits $IN_0$, $IN_1$, $IN_2$, through $IN_N$ can correspond to those of FIG. 2.

As shown in FIG. 3, scrambler component 322 can include a bit generator 360 to generate a number of sequences of bits having different values. Each of the sequences of bits can include bits 361 having bits $B_0$, $B_1$, and $B_2$ through $B_N$. Bit generator 360 can be similar to or identical to bit generator 260 of FIG. 2. Thus, the operation of bit generator 360 can be similar to or identical to that of generator 260 of FIG. 2.

In FIG. 3, scrambler component 322 can include EXOR gates 362 to perform exclusive OR operations to change the values of bits $IN_0$ through $IN_N$ on lines 291 based on the values of bits $B_0$ through $B_N$.

Adjust component 324 can include a monitor 370 to monitor the values of the bits on lines 392. Monitor 370 can provide control information CTL, which can be similar to or identical to control information CTL of FIG. 2. For example, monitor 370 can operate such that it can provide information CTL with one value (e.g., binary one) if a number of M bits on lines 392 to be consecutively provided to connection 394 have the same value, when M exceeds a selected value L, which can be similar to or identical to the selected value L described above with reference to FIG. 1A, FIG. 1B, and FIG. 2. Monitor 370 can operate such that it can provide information CTL with another value (e.g., binary zero) if a number of M bits on lines 392 to be consecutively provided to connection 394 have the same value, when M does not exceed the selected value L. As described above with reference to FIG. 1A, FIG. 1B, and FIG. 2, the selected value L can include a maximum number of consecutive bits having the same value that a receiving component (e.g., receiving component 130 of FIG. 1A) coupled to connection 394 can receive.

In FIG. 3, the number of M consecutive bits having the same value can be greater than the number of lines 392 (e.g., M>N, where N is the number of lines 392). Lines 392 can receive multiple groups of bits. The multiple groups of bits can be received on lines 392 at different times. For example, one group of bits can be received (e.g., received in parallel) on lines 392 at one time and another group of bits can be received (e.g., received in parallel) on lines 392 at another the time. Each of the multiple groups of bits can include 0 through N bits. Thus, if M>N, monitor 370 may monitor the values of multiple groups of bits on lines 392 to provide information CTL with an appropriate value.

Counters 380 and 381 can be configured to count values of the bits on the same lines 392. Counter 380 can be configured to count only bits having binary zero value on lines 392 that are to be consecutively provided to connection 394. Based on the count, counter 380 can provide a count value C0 indicating a number of bits having the same binary zero value on lines 392 that are to be consecutively provided to connection 394. Counter 381 can be configured to count only bits having binary one value on lines 392 that are to be consecutively provided to connection 394. Based on the count, counter 381 can provide a count value C1 indicating a number of bits having the same binary one value on lines 392 that are to be consecutively provided to connection 394.

The value of control information CTL can be based on count values C0 and C1 from counters 380 and 381, respectively. Monitor 370 can be configured to include (e.g., to store) the selected value L. The selected value L can be programmable. Thus, the selected value L can have a fixed value (e.g., remains at the same value after it is stored in monitor 370). The selected value L, however, can be changed by changing (e.g., reprogramming to replace) the stored value with another value (e.g., a new value).

Control information CTL can be provided with binary zero value if count value C0 from counter 380 does not exceed the selected value L and if count value C1 from counter 381 does not exceed the selected value L. Control information CTL can be provided binary one value if either count value C0 from counter 380 or count value C1 from counter 381 exceeds the selected value L.

Adjust component 324 can include an EXOR gate 384 located on a path between one of lines 392 and one of lines 393. EXOR gate 384 can include one input to receive bit $In_0$ and another input to receive control information CTL. Based on the value of control information CTL, EXOR gate 384 can conditionally change a value of a bit $In_0$.

For example, if information CTL has a binary zero value, indicating that a number of M bits on lines 392 to be provided to connection 394 may have the same value but M does not exceed the selected value L, then EXOR gate 384 can keep the value of bit $In_0$ the same. That is, if the value of bit $In_0$ on one of lines 392 (coupled to one input of EXOR gate 384) is binary zero, then the value of bit $In_0$ on one of lines 393 (coupled to the output of EXOR gate 384) is also binary zero (because the value of control information CTL at an input of EXOR gate 384 is binary zero). If the value of bit $In_0$ on one of lines 392 is binary one, then the value of bit $In_0$ on one of lines 393 is also binary one (because the value of control information CTL at an input of EXOR gate 384 is binary one).

In another example, if information CTL has a binary one value, indicating that a number of M bits on lines 392 to be provided to connection 394 have the same value but M exceeds the selected value L, then EXOR gate 384 can change the value of bit $In_0$, such that the value of bit $In_0$ on one of lines 393 is different from the value of bit $In_0$ on one of lines 392. That is, if the value of bit $In_0$ on one of lines 392 is binary zero, then the value of bit $In_0$ on one of lines 393 is binary one (because the value of control information CTL at an input of EXOR gate 384 is binary one). If the value of bit $In_0$ on one of lines 392 is binary one, then the value of bit $In_0$ on one of lines 393 is binary zero (because the value of control information CTL at an input of EXOR gate 384 is binary one).

Adjust component 324 can keep the values of bits $In_1$ through $In_N$ unchanged when bits $In_1$ through $In_N$ are provided from lines 392 to transmitting component 320.

Transmitting component 320 can operate to serially provide bits $In_0$ through $In_N$ to connection 394 in fashions similar to or identical to those of transmitting component 120 (FIG. 1A, FIG. 1B, and FIG. 1C) or transmitting component 220 (FIG. 2).

Figure 4:
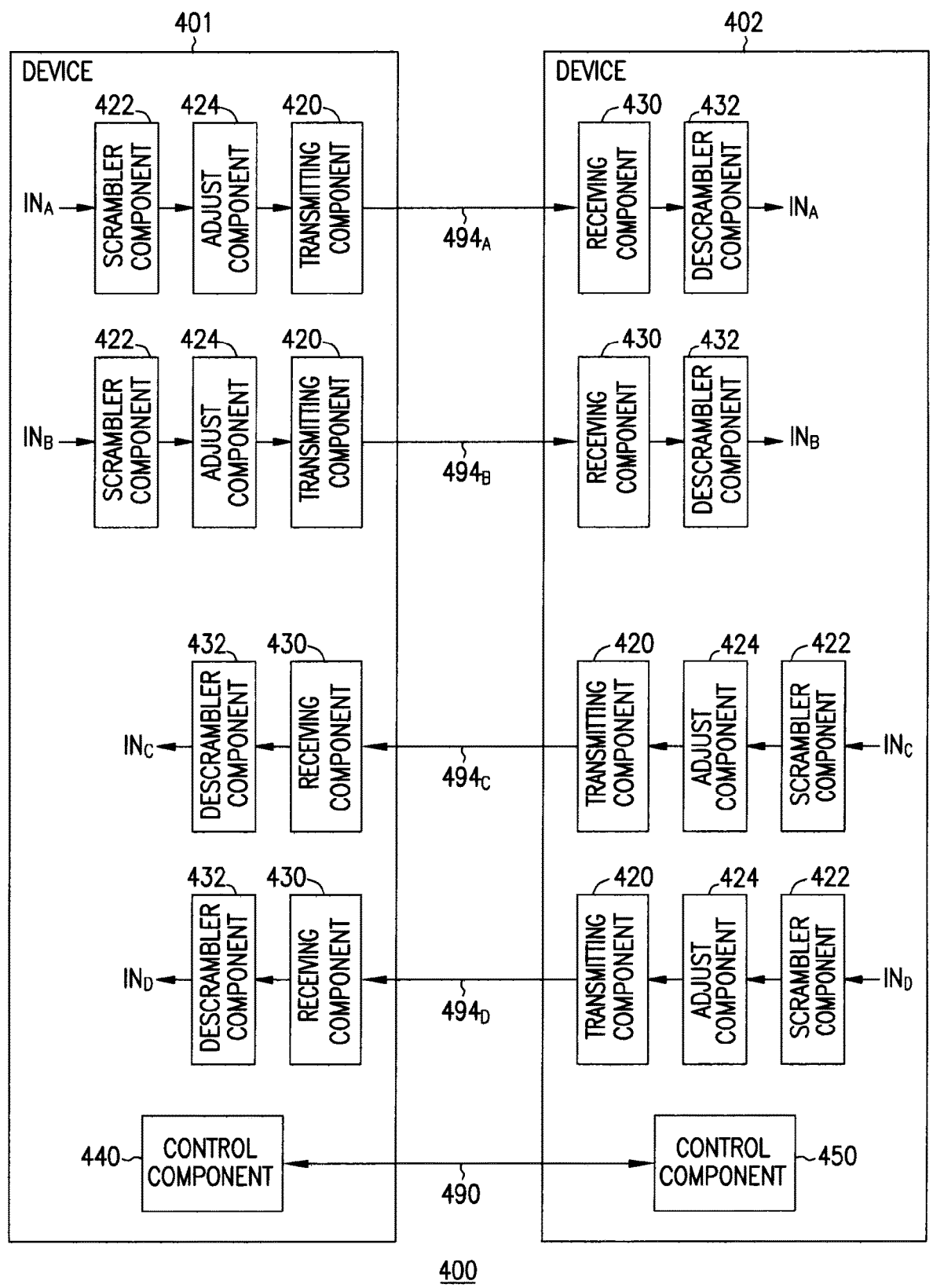
FIG. 4 is a block diagram of a system including devices that have transmitting components and receiving components, according to an embodiment of the invention.

FIG. 4 shows a system 400 including devices 401 and 402 in which each of devices 401 and 402 can include transmitting components 420 and receiving component 430, according to an embodiment of the invention. Each of devices 401 and 402 can include scrambler components 422, adjust components 424, and descrambler components 432, which can be similar to or identical to scrambler components 122, adjust components 124, and descrambler components 132, respectively, of FIG. 1A. Each of transmitting components 420 can be similar to or identical to transmitting component 120 (FIG. 1A), transmitting component 220 (FIG. 2), or transmitting component 320 (FIG. 3). Each of receiving components 430 can be similar to or identical to receiving component 130 (FIG. 1A). Device 401 and 402 can exchange information through connections $494_A$, $494_B$, $494_C$, and $494_D$.

As shown in FIG. 4, device 401 can provide information $IN_A$ and $IN_B$ to device 402 through connection $494_A$ and $494_B$, respectively. Device 402 can provide information $IN_C$ and $IN_D$ to device 401 through connection $494_C$ and $494_D$, respectively. Devices 401 and 402 can include control components 440 and 450, respectively, to communicate with each other through connection 490.

FIG. 4 shows an example of two connections $494_A$ and $494_B$ to allow device 401 to provide information to device 402 and two connections $494_C$ and $494_D$ to allow device 402 to provide information to device 401. The number of these connections can vary. For example, system 400 can include more than two connections similar to or identical to connections $494_A$ and $494_B$ that can form a link, such that device 401 can provide information to device 402 at a rate of multiple (e.g., 10 to 15) gigabits per second. In another example, system 400 can include more than two connections similar to or identical to connections 494$_C$ and 494$_D$ that can form a link, such that device 402 can provide information to device 401 at a rate of multiple (e.g., 10 to 15) gigabits per second.

The devices 401 and 402 of system 400 can include operations similar to or identical to those described above with reference to FIG. 1A through FIG. 3. For example, each of adjust components 424 in FIG. 4 can be similar to or identical to adjust component 124 of FIG. 1A, adjust component 224 of FIG. 2, or adjust component 324 of FIG. 3. Thus, each of adjust components 424 of device 401 can operate to conditionally change a value of a bit among a number of M bits of a plurality of bits to be provided from device 401 to device 402 through one or more of connections 494$_A$ and 494$_B$, before the bit (or multiple bits) is provided to these connections. Such a condition can occur when M exceeds a maximum number (e.g., the selected value L) of consecutive bits having the same value that one of receiving components 430 of device 402 is configured to receive. Changing the value of a bit among a number of M bits of a plurality of bits forces an error in the plurality of bits. The error can be corrected by either performing an error detection and correction (e.g., performed by device 402) or by performing a retransmission operation (e.g., performed by device 401 after it receives a retransmission request sent by device 402), as described above with reference to FIG. 1 through FIG. 3.

Similarly, each of adjust components 424 of device 402 can operate to conditionally change a value of a bit (or multiple bits) among a number of M bits of a plurality of bits to be provided from device 402 to device 401 through one or more of connections 494$_C$ and 494$_D$, before the bit (or multiple bits) is provided to these connections. Such a condition can occur when M exceeds a maximum number (e.g., the selected value L) of consecutive bits having the same value that one of receiving components 430 of device 401 is configured to receive.

Figure 5:
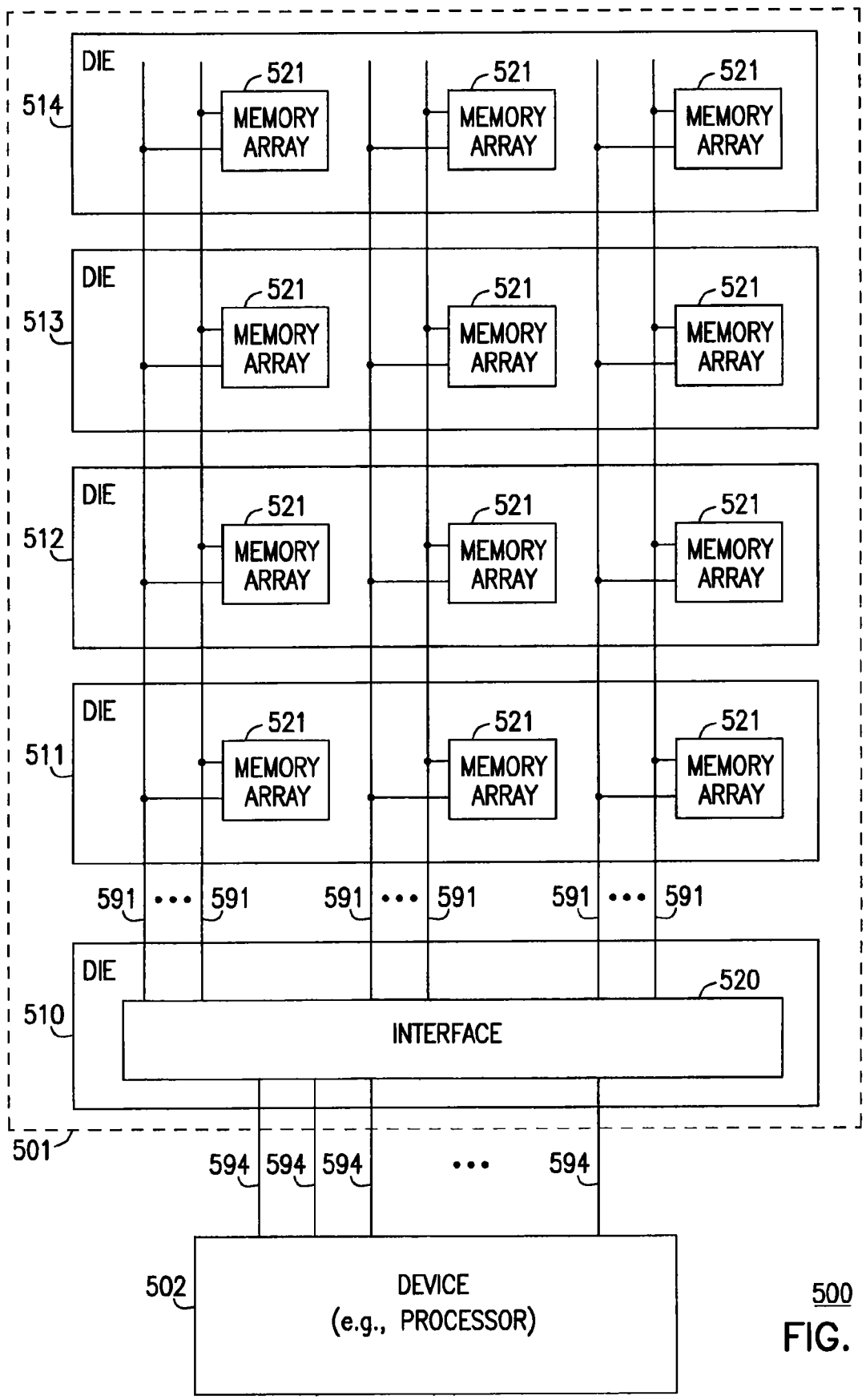
FIG. 5 is a block diagram of a system including a device having dice arranged in a stack, according to an embodiment of the invention.

FIG. 5 is a block diagram of a system 500 including device 501 having dice 510 to 514, according to an embodiment of the invention. Device 501 can correspond to device 101 (FIG. 1A), device 201 (FIG. 2), device 301 (FIG. 3), and/or device 401 (FIG. 4). Each of dice 510 to 514 in FIG. 5 can include semiconductor material (e.g., silicon), of which at least some components of device 501 can be formed. FIG. 5 shows an example where dice 510 to 514 can be arranged in a stack (e.g., one die physically formed on top of another) within device 501. Alternatively, one or more dice 510 to 514 can be located outside the stack. For example, dice 511, 512, 513, and 514 can be arranged in a stack and die 510 can be located outside the stack. In other words, in an alternative arrangement, die 510 may not be in a stack with dice 511, 512, 513, and 514.

As shown in FIG. 5, each of dice 510 to 514 can include a number of memory arrays 521. Each of memory arrays 521 can include memory cells (not shown in FIG. 5) to store information, which can be similar to or identical to information IN on line 191 of FIG. 1A, information including bits IN$_0$, IN$_1$, and IN$_2$ through IN$_N$ of FIG. 2 and FIG. 3, and information IN$_A$, IN$_B$, IN$_C$, and IN$_D$ of FIG. 4. Each of memory arrays 521 can include DRAM memory cells or other types of memory cells.

As shown in FIG. 5, device 501 can include conductive lines (e.g., data lines such as bit lines and access lines such as word lines) 591 that can be used to provide information to and from memory arrays 521. Lines 591 may extend through some or all of dice 510 to 514. FIG. 5 shows each of lines 591 crossing the dice (e.g., dice 511, 512, and 513) to indicate that at least a portion of each of lines 591 can physically extend through a via included in one or more of the dice. The via can include a through-silicon-via (TSV). The TSV may not necessary go entirely through the silicon.

One of dice 510 to 514 can include an interface 520, which can include components (e.g., control components and other components) that can be implemented by software, firmware, hardware, or combination of software, firmware, and hardware. The components of interface 520 can include control components, transmitting components, scrambler component, adjust component, receiving components, and descrambler component that can be similar to or identical to those described above with reference to FIG. 1A through FIG. 4.

Device 502 can correspond to device 102 of FIG. 1A. For example, device 502 can include a processor, an ASIC, or other types of processing components.

System 500 can include connections 594 to allow devices 501 and 502 to exchange information with each other. Each of connections 594 can correspond to connection 194 (FIG. 1A), connection 294 (FIG. 2), connection 394 (FIG. 3), or one of connections 494$_A$, 494$_B$, 494$_C$, and 494$_D$ (FIG. 4).

Some conventional systems may use some techniques to prevent an occurrence of a certain number of bits having consecutive bits. For example, some conventional systems may include extra codes to information and provide both codes and information through connections between devices. In some cases, overhead in providing such codes and information may consume a significant percentage (e.g., up to 20% in some cases) of bandwidth available for providing information between devices.

In the systems and devices described herein, such as system 100 (FIG. 1A), system 400 (FIG. 4), and system 500 (FIG. 5), conditionally changing the value of one or more bit among consecutive bits to be provided to a connection between device may reduce a significant amount of overhead that some conventional systems may experience. Therefore, available bandwidth for providing information (e.g., data) between devices can be higher than that of some conventional techniques.

FIG. 6A, FIG. 6B, and FIG. 6C show example values of bits of information including bits In$_0$, In$_1$, In$_2$, and In$_3$ with M consecutive bits having the same binary zero value, according to an embodiment of the invention. In FIG. 6A, T0 to T6 represent different times. Time T0 can occur before time T1, which can occur before time T2, and so on, such that time T6 can occur after time T5. A time interval between two consecutive times among times T0 to T6 can be based on a period (e.g., a single cycle) of a clock signal, such as clock signal CLK of FIG. 1A or other clock signals generated based on clock signal CLK. For example, a time interval between times T0 and T1 or between times T1 and T2 can be equal to the period of clock signal CLK, a fraction of the period of clock signal CLK, or a multiple of the period of clock signal CLK.

As shown in FIG. 6A, multiple groups of bits In$_0$, In$_1$, In$_2$, and In$_3$ can have values (binary values) of "1100" at time T0, "0000" at each of times T1, T2, T3, and T4, "0001" at time T5, and "1010" at time T6. Bits In$_0$, In$_1$, In$_2$, and In$_3$ can correspond to bits In$_0$, In$_1$, In$_2$, and In$_N$, respectively, on lines 292 of FIG. 2 or on lines 392 of FIG. 3, where N=3. Thus, the bits in FIG. 6A can be provided by changing bits of information, such as changing bits of information on line 191 (FIG. 1A), lines 291 (FIG. 2), or lines 391 (FIG. 3). FIG. 6A shows an example of seven groups of bits In$_0$, In$_1$, In$_2$, and $In_3$ received at seven different times (from T0 to T6). The number of groups of bits can vary.

Portions of the information in FIG. 6A can be concurrently received by a transmitting component, such as the transmitting components described above with reference to FIG. 1A through FIG. 5. For example, the transmitting component can concurrently receive a portion having bits values "00" associated with bits $In_0$ and $In_1$ at time T0 and another portion having values "11" associated with bits $In_2$ and $In_3$ at time T0. In another example, the transmitting component can concurrently receive a portion having bits values "00" associated with bits $In_0$ and $In_1$ at time T1 and another portion having values "00" associated with bits $In_2$ and $In_3$ at time T1.

The information including the bits of FIG. 6A can be monitored by an adjust component, such as adjust component 124, 224, 324, and 424 of FIG. 1, FIG. 2, FIG. 3, and FIG. 4, respectively. Then, the bits can be serially provided to a connection. The connection described with reference to FIG. 6A through FIG. 7I can include a connection described above with reference to FIG. 1A through FIG. 5, such as connection 194 of FIG. 1A, connection 294 of FIG. 2, connection 394 of FIG. 3, connections 494$_A$, 494$_B$, 494$_C$, and 494$_D$ of FIG. 4, and connections 594 of FIG. 5.

FIG. 6B shows an example bit order of the bits of FIG. 6A that are to be provided to such a connection where bits 600 include M (e.g., M=16) consecutive bits having the same binary zero value. In FIG. 6B and FIG. 6C, "L" corresponds to the selected value L associated with a receiving component, such as the receiving components described above with reference to FIG. 1A to FIG. 5.

As shown in FIG. 6B, if M does not exceed the selected value L (e.g., M≤L), then the information provided to the connection can include bits 600 without a value of any bit among bits 600 being changed. If M exceeds the selected value L (e.g., M>L), then, as shown in FIG. 6C, the information provided to the connection can include bits 600 where a value of a bit (e.g., bit $In_0$ at time T4) is changed from binary zero to binary one. An adjust component similar to or identical to those described above with reference to FIG. 1A to FIG. 5 can monitor the bits in FIG. 6A to conditionally change the value of one of bits 600.

FIG. 6D, FIG. 6E, and FIG. 6F show other example values of bits of information including bits $In_0$, $In_1$, $In_2$, and $In_3$ with M consecutive bits having the same binary zero value, according to an embodiment of the invention. FIG. 6D shows information including the bits 602 to be monitored and then provided to a connection. FIG. 6D shows an example of seven groups of bits $In_0$, $In_1$, $In_2$, and $In_3$ received at seven different times (from T0 to T6). The number of groups of bits can vary. FIG. 6E shows an example bit order of the bits of FIG. 6D that are to be provided to such a connection where bits 602 include M (e.g., M=18) consecutive bits having the same binary zero value. As shown in FIG. 6E, if M does not exceed the selected value L (e.g., M≤L), then the information provided to the connection can include bits 602 without a value of any bit among bits 602 being changed. If M exceeds the selected value L (e.g., M>L), then, as shown in FIG. 6F, the information provided to the connection can include bits 602 where a value of a bit (e.g., bit $In_0$ at time T4) is changed from binary zero to binary one.

FIG. 6G, FIG. 6H, and FIG. 6I show other example values of bits of information including bits $In_0$, $In_1$, $In_2$, and $In_3$ with M consecutive bits having the same binary zero value, according to an embodiment of the invention. FIG. 6G shows information including the bits 604 to be monitored and then provided to a connection. FIG. 6G shows an example of seven groups of bits $In_0$, $In_1$, $In_2$, and $In_3$ received at seven different times (from T0 to T6). The number of groups of bits can vary. FIG. 6H shows an example bit order of the bits of FIG. 6G that are to be provided to such a connection where bits 604 include M (e.g., M=16) consecutive bits having the same binary zero value. As shown in FIG. 6H, if M does not exceed the selected value L (e.g., M≤L), then the information provided to the connection can include bits 604 without a value of any bit among bits 604 being changed. If M exceeds the selected value L (e.g., M>L), then, as shown in FIG. 6I, the information provided to the connection can include bits 604 where a value of a bit (e.g., bit $In_0$ at time T6) is changed from binary zero to binary one.

FIG. 7A, FIG. 7B, and FIG. 7C shows example values of bits of information including bits $In_0$, $In_1$, $In_2$, and $In_3$ with M consecutive bits having the same binary one value, according to an embodiment of the invention. FIG. 7A shows information to be monitored and provided to a connection. FIG. 7A shows an example of seven groups of bits $In_0$, $In_1$, $In_2$, and $In_3$ received at seven different times (from T0 to T6). The number of groups of bits can vary. FIG. 7B shows an example bit order of the bits of FIG. 7A that are to be provided to such a connection where bits 700 include M (e.g., M=16) consecutive bits having the same binary one value. As shown in FIG. 7B, if M does not exceed the selected value L (e.g., M≤L), then the information provided to the connection can include bits 700 without a value of any bit among bits 700 being changed. If M exceeds the selected value L (e.g., M>L), then, as shown in FIG. 7C, the information provided to the connection can include bits 700 where a value of a bit (e.g., bit $In_0$ at time T4) is changed from binary one to binary zero.

FIG. 7D, FIG. 7E, and FIG. 7F show other example values of bits of information including bits $In_0$, $In_1$, $In_2$, and $In_3$ with M consecutive bits having the same binary one value, according to an embodiment of the invention. FIG. 7D shows information including the bits 702 to be monitored and then provided to a connection. FIG. 7D shows an example of seven groups of bits $In_0$, $In_1$, $In_2$, and $In_3$ received at seven different times (from T0 to T6). The number of groups of bits can vary. FIG. 7E shows an example bit order of the bits of FIG. 7D that are to be provided to such a connection where bits 702 include M (e.g., M=18) consecutive bits having the same binary one value. As shown in FIG. 7E, if M does not exceed the selected value L (e.g., M≤L), then the information provided to the connection can include bits 702 without a value of any bit among bits 702 being changed. If M exceeds the selected value L (e.g., M>L), then, as shown in FIG. 7F, the information provided to the connection can include bits 702 where a value of a bit (e.g., bit $In_0$ at time T4) is changed from binary one to binary zero.

FIG. 7G, FIG. 7H, and FIG. 7I show other example values of bits of information including bits $In_0$, $In_1$, $In_2$, and $In_3$ with M consecutive bits having the same binary one value, according to an embodiment of the invention. FIG. 7G shows information including the bits 704 to be monitored and then provided to a connection. FIG. 7G shows an example of seven groups of bits $In_0$, $In_1$, $In_2$, and $In_3$ received at seven different times (from T0 to T6). The number of groups of bits can vary. FIG. 7H shows an example bit order of the bits of FIG. 7G that are to be provided to such a connection where bits 704 include M (e.g., M=16) consecutive bits having the same binary one value. As shown in FIG. 7H, if M does not exceed the selected value L (e.g., M≤L), then the information provided to the connection can include bits 704 without a value of any bit among bits 704 being changed. If M exceeds the selected value L (e.g., M>L), then, as shown in FIG. 7I, the information provided to the connection can include bits 704 where a value of a bit (e.g., bit $In_0$ at time T6) is changed from binary one to binary zero.

Figure 8:
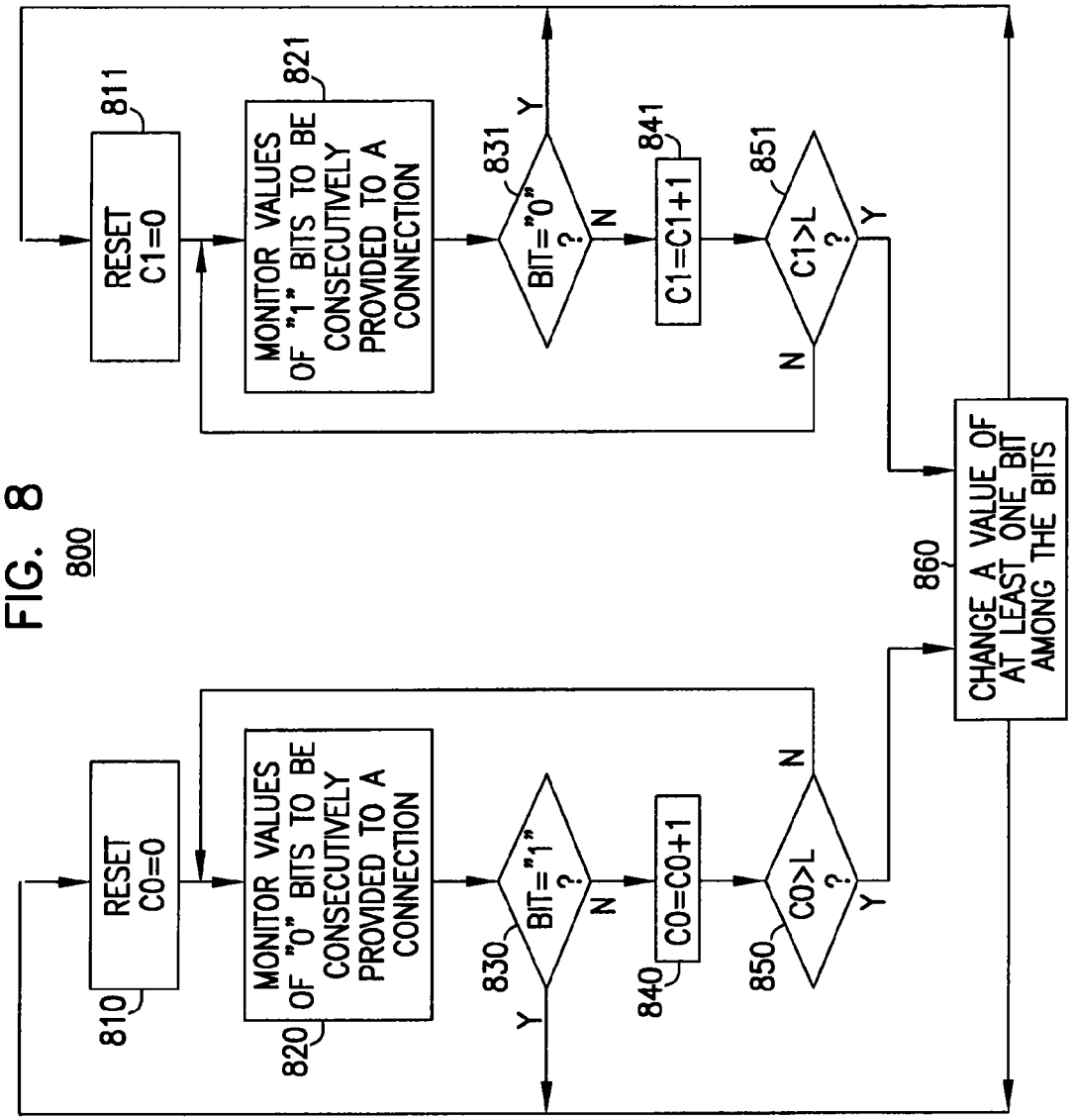
FIG. 8 is a flow diagram showing a method of conditionally changing a value of at least one bit among consecutive bits having the same value, according to an embodiment of the invention.

FIG. 8 is a flow diagram showing a method 800, according to an embodiment of the invention. Method 800 can be performed by a device, such as devices described above with reference to FIG. 1A through FIG. 7. For example, method 800 can be performed by at least adjust component 124 of device 101 FIG. 1, adjust component 224 of device 201 FIG. 2, or adjust component 324 of device 301 of FIG. 3.

Method 800 can operate to monitor the value of bits to be provided to a connection. The connection associated with method 800 can include connection 194 of FIG. 1A, connection 294 of FIG. 2, connection 394 of FIG. 3, connections 494$_A$, 494$_B$, 494$_C$, and 494$_D$ of FIG. 4, and connections 594 of FIG. 5. Based on the monitoring, method 800 can conditionally change a value of a bit among the consecutive bits having the same value (either binary zero or one) before the bits are provided to the connection.

As shown in FIG. 8, method 800 can include activities 810, 820, 830, 840, and 850 to conditionally change a value of a bit among the consecutive bits having the same binary zero before the bits are provided to the connection. Method 800 can also include activities 811, 821, 831, 841, and 851 to conditionally change a value of a bit among the consecutive bits having the same binary one before the bits are provided to the connection.

Activity 810 can include resetting a count value C0 to an initial value (e.g., decimal zero). Count value C0 can be associated with a counter (e.g., counter 380 of FIG. 3) that can count values of bits having the same binary zero value to be consecutively provided to the connection.

Activity 811 can include resetting a count value C1 to an initial value (e.g., decimal zero). Count value C1 can be associated with a counter (e.g., counter 381 of FIG. 3) that can count values of bits having the same binary one value to be consecutively provided to the connection.

Activity 820 can include monitoring bits having the same binary zero value to be consecutively provided to the connection. The bits can be provided on lines such as lines 292 of FIG. 2 or lines 392 of FIG. 3.

Activity 821 can include monitoring bits having the same binary one value to be consecutively provided to the connection. The bits can be provided on lines such as lines 292 of FIG. 2 or lines 392 of FIG. 3.

Activity 830 can include checking whether the value of a bit among the bits (monitored in activity 820) is binary one. If the value of the bit is binary one, then method 800 can repeat activity 810 to reset count value C0 to the initial value. If the value of the bit is not binary one, then method 800 can continue with activity 840, which can increase count value C0 by one, as part of tracking the bits having the same binary zero value to be consecutively provided to the connection.

Activity 831 can include checking whether the value of a bit among the bits (monitored in activity 821) is binary zero. If the value of the bit is binary zero, then method 800 can repeat activity 811 to reset count value C1 to the initial value. If the value of the bit is not a binary zero, then method 800 can continue with activity 841, which can increase count value C1 by one, as part of tracking the bits having the same binary one value to be consecutively provided to the connection.

Activity 850 can include checking whether count value C0 is greater than the selected value L associated with a receiving component (e.g., receiving component 130 of FIG. 1A) that receives the bits from the connection. If count value is not greater than the selected value L, then method 800 can repeat activity 820. If count value C0 is greater than the selected value L, then method 800 can continue with activity 860.

Activity 851 can include checking whether count value C1 is greater than the selected value L associated with the receiving component. If count value is not greater than the selected value L, then method 800 can repeat activity 821. If count value C0 is greater than the selected value L, then method 800 can continue with activity 860.

Activity 860 can include changing a value of at least one bit among the bits having the same value. For example, activity 860 can change the value of one of the bits having the same value from binary zero to binary one if count value C0 is greater than the selected value L. In another example, activity 860 can change the value of one of the bits having the same value from binary one to binary zero if count value C1 is greater than the selected value L.

Method 800 can include additional activities described above with reference to FIG. 1A through FIG. 7I.

Figure 9:
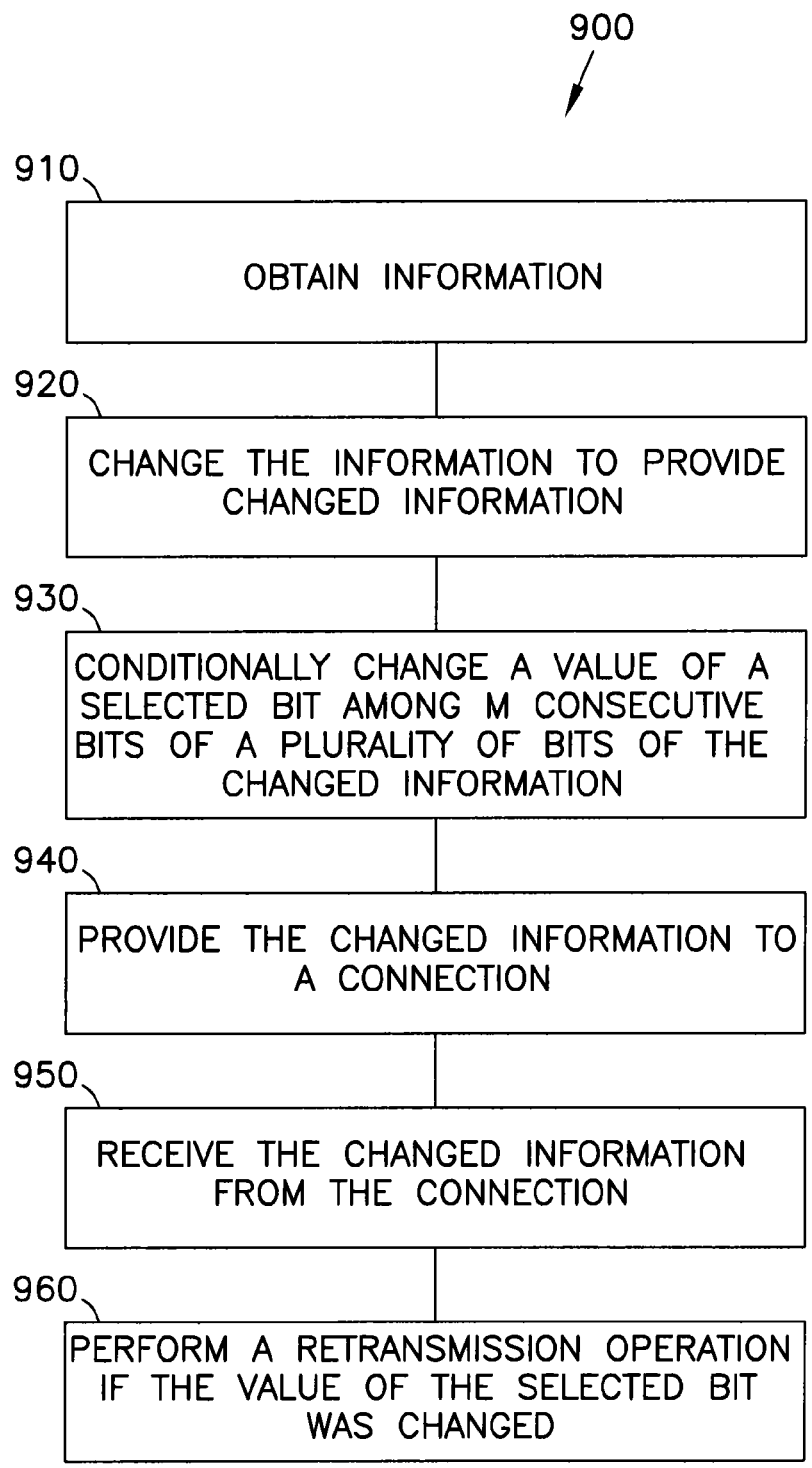
FIG. 9 is a flow diagram showing a method of exchanging information between devices in a system, according to an embodiment of the invention.

FIG. 9 is a flow diagram showing a method 900, according to an embodiment of the invention. Method 900 can be performed by a system to exchange information between devices of the system. The system and devices associated with method 900 can include systems and devices described above with reference to FIG. 1A through FIG. 8. For example, the system associated with method 900 can include system 100 (FIG. 1A), system 200 (FIG. 2), system 300 (FIG. 3), system 400 (FIG. 4), and system 500 (FIG. 5). Thus, connections for exchanging information between devices in the system associated with method 900 can include connection 194 of FIG. 1, connection 294 of FIG. 2, connection 394 of FIG. 3, connection 494$_A$, 494$_B$, 494$_C$, or 494$_D$ of FIG. 4, and connection 594 of FIG. 5.

As shown in FIG. 9, method 900 can include activities 910, 920, 930, 940, 950, and 960.

Activity 910 can include obtaining information in a device. The information can include information stored in at least one memory array, such as at least one of memory arrays 521 of FIG. 5.

Activity 920 can include changing the information to provide changed information.

Activity 930 can include conditionally changing a value of a selected bit (or multiple bits) among the consecutive bits having the same value (either binary zero or one) of bits of the changed information to be provided to the connection. Changing the value of the selected bit (or multiple bits) forces an error in the changed information. Activity 930 can include some or all of activities of method 800 of FIG. 8.

Activity 940 can include providing the bits of the changed information to the connection.

Activity 950 can include receiving the changed information from the connection. Another device coupled to the connection can operate to receive the changed information from the connection.

Activity 960 can include performing a retransmission operation if activity 930 changes the value of the bit among the consecutive bits having the same value. For example, activity 960 can perform an operation to change the information obtained in activity 910 and repeat activity 920, 930, 940, and 950. Alternatively, activity 960 can include correcting the value of the bit among the consecutive bits having the same value if the value of the bit was changed in activity 930.

Activities of method 900 can be performed by one or more devices of the system. For example, method 900 can be performed by device 101 of FIG. 1A, to provide information from device 101 to device 102, or performed by device 102 to provide information from device 102 to device 101. Devices 101 and 102 can perform method 900 at substantially the same time to provide information to each other via connection 194 at substantially the same.

In another example, method 900 can be performed by device 401 of FIG. 4, to provide information from device 401 to device 402, or performed by device 402 to provide information from device 401. Devices 401 and 402 can perform method 900 at substantially the same time to provide information to each other at $49_{4A}$, $49_{4B}$, $49_{4C}$, or $49_{4D}$ In a further example, method 900 can be performed by device 501 of FIG. 5, to provide information from device 501 to device 502, or performed by device 502 to provide information from device 501. Devices 501 and 502 can perform method 900 at substantially the same time to provide information to each other on connections at 594 at substantially the same time.

Method 900 can include additional activities described above with reference to FIG. 1A through FIG. 8.

The illustrations of apparatuses (e.g. system 100, 200, 300, 400, and 500) are intended to provide a general understanding of the structure of various embodiments and are not intended to provide a complete description of all the elements and features of apparatuses that might make use of the structures described herein.

Systems 100, 200, 300, 400, and 500 may be included in apparatuses (e.g., electronic circuitry) such as high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 5) players), vehicles, medical devices (e.g., heart monitor, blood pressure monitor, etc.), set top boxes, and others.

The embodiments described above with reference to FIG. 1 through FIG. 9 include apparatuses and methods having an adjust component to change a value of a bit among a number of M bits of information when the M bits have the same value and when M exceeds a selected value. At least one of such embodiments can include a transmitting component to provide the information to a connection. At least one of such embodiments can include a receiving component to receive the information from the connection. In at least one of such embodiments, the selected value can include a maximum number of consecutive bits having the same value that such a receiving component can be configured to receive. Other embodiments including additional apparatuses and methods are described.

The above description and the drawings illustrate some embodiments of the invention to enable those skilled in the art to practice the embodiments of the invention. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

What is claimed is:

1. A system comprising a first device and a second device coupled to the first device, wherein,
the first device comprises:
    a first component including logic configured to scramble a data to produce a first scrambled data; and
    a second component including a transmitter circuit coupled to the logic and configured to transmit the first scrambled data to the second device; and
the second device comprises:
    a third component including a receiving circuit coupled to the transmitter circuit and configured to receive the first scrambled data and detect whether the first scrambled data is in error; and
    a control component coupled to the logic and the transmitter circuit and configured to request, when the first scrambled data is detected in error, the first device to scramble the data to produce a second scrambled data and transmit the second scrambled data to the second device, wherein the first device comprises a memory to store the data, and the second scrambled data is produced by the first memory device based on the data stored in the memory of the first device.

2. The system of claim 1, wherein the first device is configured to store the data in the first device until the first device confirms the first scrambled data is received by the second device and the first scrambled data is not in error.

3. The system of claim 1, wherein first component is configured to produce the first scrambled data, such that the first scrambled data includes sequences of bits having different pseudo random values.

4. The system of claim 1, wherein the first scrambled data includes M consecutive bits having a same value, and the first device comprises a component including additional logic to change a value of at least one bit among the M consecutive bits when M consecutive bits exceeds a limit value L associated with the third component.

5. A system comprising a first device and a second device coupled to the first device, wherein,
the first device comprises:
    a first component including first logic configured to scramble a data to produce a first scrambled data;
    a second component including second logic coupled to the first logic and configured to force an error in the first scrambled data and produce an erroneous scrambled data;
    a third component including a transmitter circuit coupled to the second logic and configured to transmit the erroneous scrambled data to the second device;
    the first component to scramble the data to produce a second scrambled data; and
    the third component to transmit the second scrambled data to the second device after the erroneous scrambled data is transmitted to the second device, wherein the first device comprises a memory to store the data, and the second scrambled data is produced by the first memory device based on the data stored in the memory of the first device.

6. The system of claim 5, wherein the second component is to force the error in the first scrambled data when M bits of the first scrambled data have a same value and M exceeds a selected value L.

7. The system of claim 6, wherein the second component is not to force the error in the first scrambled data when M does not exceed the selected value L.

8. The system of claim 5, wherein the second device is configured to send a retransmission request to the first device after the second device receives the erroneous scrambled data.

9. The system of claim 5, wherein e first device is configured to send a retransmission notification to the second device after the erroneous scrambled data is transmitted to the second device.

10. A method comprising:
scrambling, using logic at a first device, a data at the first device to produce a first scrambled data;
storing the data in the first device;
transmitting, using a transmitter circuit at the first device, the first scrambled data from the first device to a second device;
receiving, using a receiving circuit at the second device, the first scrambled data at the second device;
descrambling the first scrambled data at the second device;
detecting at the second device whether the first scrambled data is in error; and
requesting the first device to scramble the data to produce a second scrambled data and transmit the second scrambled data to the second device, wherein requesting is performed by the second device when the first scrambled data is detected in error, and the second scrambled data is produced by the first device based on the data stored in the first device.

11. The method of claim 10, wherein the data is stored in a memory of the first device until the first device confirms the first scrambled data is received by the second device and the first scrambled data is not in error.

12. The method of claim 10, wherein the first rambled data includes sequences of bits having different pseudo random values.

13. The method of claim 10, wherein the first scrambled data includes M consecutive bits having a same value, and the first device comprises a component to change a value of at least one bit among the M consecutive bits when M consecutive bits exceeds a limit value L associated with the third component.

14. The method of claim 10, further comprising:
forcing the error in the first scrambled data when M bits of the first scrambled data have a same value and M exceeds a selected value L.

15. The method of claim 14, further comprising:
not to force the error in the first scrambled data when M does not exceed the selected a L.

16. The method of claim 10 wherein transmitting the first scrambled data from the first device to a second device includes transmitting erroneous scrambled data to the second device.

17. The method of claim 16, further comprising:
sending a retransmission request to the first device after the second device receives the erroneous scrambled data.

18. The method of claim 16, further comprising:
sending a retransmission notification to the second device after the erroneous scrambled data is transmitted to the second device.

* * * * *